United States Patent
Seler

(10) Patent No.: US 11,194,018 B2
(45) Date of Patent: Dec. 7, 2021

(54) VEHICLE RADAR SENSOR AND METHOD OF OPERATION

(71) Applicant: NXP USA, Inc., Austin, TX (US)

(72) Inventor: Ernst Seler, Munich (DE)

(73) Assignee: NXP USA, Inc., Austin, TX (US)

( * ) Notice: Subject to any disclaimer, the term of this patent is extended or adjusted under 35 U.S.C. 154(b) by 311 days.

(21) Appl. No.: 16/385,518

(22) Filed: Apr. 16, 2019

(65) Prior Publication Data

US 2020/0110153 A1 Apr. 9, 2020

(30) Foreign Application Priority Data

Aug. 23, 2018 (EP) .................................... 18190464

(51) Int. Cl.
G01S 7/40 (2006.01)
G01S 13/931 (2020.01)
G01S 13/00 (2006.01)

(52) U.S. Cl.
CPC .......... *G01S 7/4026* (2013.01); *G01S 13/931* (2013.01); *G01S 7/4034* (2021.05); *G01S 2013/932* (2020.01)

(58) Field of Classification Search
CPC ................. G01S 7/4026; G01S 13/931; G01S 2013/932; G01S 2007/4034; G01S 2013/93272; G01S 2013/93271; G01S 13/86; G01S 7/40; G01S 7/4034
See application file for complete search history.

(56) References Cited

U.S. PATENT DOCUMENTS

| | | | |
|---|---|---|---|
| 6,459,476 B2 | 10/2002 | Nishimura | |
| 8,390,507 B2 | 3/2013 | Wintermantel | |
| 9,733,348 B2* | 8/2017 | Gazit | G01S 13/931 |
| 2005/0285778 A1* | 12/2005 | Shinagawa | G01S 7/4026 342/173 |
| 2013/0154870 A1* | 6/2013 | Mills | G01S 13/931 342/70 |
| 2013/0154871 A1* | 6/2013 | Gaboury | G01S 7/4026 342/82 |
| 2016/0003938 A1 | 1/2016 | Gazit et al. | |

FOREIGN PATENT DOCUMENTS

DE 102016207213 A1 11/2017

OTHER PUBLICATIONS

Kionix Inc., "±4g Tri-axis Analog Accelerometer Specifications," Part No. KXTC8-1071, Rev. 1, May 2012, 10 pages.
Nxp, "High Accuracy Low g Inertial Sensor," Data Sheet, Document No. MMA690xKQ, Rev, 5, Aug. 2012, downloaded from https://www.nxp.com/docs/en/data-sheet/MMA69XX.pdf on Apr. 12, 2019, 37 pages.

* cited by examiner

Primary Examiner — Bernarr E Gregory

(57) ABSTRACT

A radar sensor for use in a vehicle is described. The radar sensor comprising: at least one transmitter and at least once receiver to transmit and receive radar signals of the radar sensor; an acceleration sensor to measure the acceleration of said radar sensor or the chassis of said vehicle; a processor coupled to said acceleration sensor to calculate a tilt in a radar signal projected from said vehicle using said measured acceleration; a memory for storing said calculated radar tilt.

14 Claims, 5 Drawing Sheets

VEHICLE RADAR SENSOR AND METHOD OF OPERATION

FIELD OF THE INVENTION

This invention relates to a radar system for use in a vehicle, to measure and/or correct any tilt in the radar beam that may arise due to the driving conditions.

BACKGROUND OF THE INVENTION

There has been an increased demand for active safety systems for vehicles. Active safety systems require multiple radar sensors per vehicle, each radar sensor typically working with a specific radar technology. In an automotive application, the radar sensors are mostly built using a number of integrated circuits (ICs), sometimes referred to as 'chips'. The current trend is towards offering a radar system on chip (SoC, using a radio frequency (RF) CMOS process technology) solution in order to reduce cost and power consumption.

Commercial automotive radar sensors typically include multiple receivers and transmitters (the combination of which is referred to as transceivers (TRx)), implemented as a phased array radar system, in order to improve the output power, receiver sensitivity and angular resolution. A microcontroller (MCU) performs digital control of the transceiver circuits and digital signal processing of the digitized data (e.g. fast Fourier transform (FFT) and digital signal processing) in order to output processed radar data to a central processing unit (CPU) of the vehicle.

Additionally, there are a handful of radar sensor technologies adopted and installed by leading vehicle manufacturers. Each of these differs in terms of operational principles and typically each radar sensor architecture (and associated radar technology) is supported by a dedicated IC set. It is known that radar systems with a larger number of transceiver units, configured to work in parallel, provide a better angle estimation accuracy and detection range. It is also known that radar customers desire radar transceiver ICs that can support multi-chip cascading for enhancing the precision of the targets localisation and path prediction of their system.

Many vehicles today will use radar systems to provide information on the surrounding conditions, to detect other vehicles or pedestrians on the road, or other objects on the road the vehicle is travelling on. The radar can also be used to detect the overall conditions of the road the vehicle is travelling on. This is illustrated in FIG. 1. Generally, the radar is installed on the front and/or rear of the vehicle 100 and is generally positioned vertically with respect to the direction of travel of the vehicle, as the vehicle drives along the road 102, (direction of travel shown by arrow A) the radar will project a beam at a known angle. Assuming that the vehicle is travelling on a flat surface, and the vehicle 100 maintains a stable position as it drives along the road, then the radar will have a standard known projection in front of the vehicle 104. When the rear of the vehicle is lower than the front (for example if the vehicle is carrying a heavy load at the rear) then the front of the vehicle will be higher than the rear, and so radar from the front of the vehicle will have an upward tilt. Conversely, if the vehicle 100 brakes sharply, the front of the vehicle will tilt downwards, and the radar from the front of the vehicle will have a downward tilt 106. In some cases, for example, if the vehicle is travelling along an uneven road surface, then the front of the vehicle will move up and down according to the road surface, and the angle of the radar beam from the front of the car will change as the surface of the road changes 108. These possible alternatives are shown in FIG. 1.

As shown in FIG. 1, when the vehicle 100 brakes, there is a down tilt to the beam, whereas when the vehicle accelerates the tilt is upwards (not shown in the figure). As also shown in FIG. 1 the beam may tilt up and down in an arbitrary manner as the vehicle drives over an uneven road surface. The tilt will also vary according to the acceleration or braking speed, and may also be affected by the vehicle dimensions, spring of the tyre and other parameters related to the vehicle. However, these have less effect on the tilt that the speed. These "vehicle" parameters may vary between cars, for example a more expensive vehicle may have suspension that can compensate for uneven road surfaces, compared to more basic vehicles Presently, there is a demand in the automotive industry to enable radar systems on the vehicles to perform elevation measurements that have good resolution. Current systems typically have a resolution of 1°.

Movements of the vehicle as the vehicle is travelling e.g. due to bumpy roads, acceleration, breaking, may result in changes to the tilt of the transmitted radar signal. This applies to regular vehicles with a human driver as well as to autonomous driving vehicles. This may result in significant errors in the measured elevation angle of the radar signal. Travelling large distances may also exacerbate this problem. A small tilt in the radar beam can result in a significant difference in the measured elevation, and this will increase as the distance increases. For example, a 1.4 degree beam tilt over a distance of 200 m will lead to a 5 m difference in the measured height, whereas a 2.8 degree beam tilt will give the same 5 m difference in height, but at a distance of 100 m.

SUMMARY OF THE INVENTION

Examples of the present invention provide a radar device that can calculate and adjust the tilt in a beam angle due to movements of the vehicle, as described in the accompanying claims. Specific embodiments of the invention are set forth in the dependent claims. These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE INVENTION

Because the illustrated example embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

The inventors have recognised and appreciated that improved resolution of a radar device is desirable. As automotive radar sensors are developed, they will be required to have higher resolution, for example, the improved resolution may help to decide if it is possible for the vehicle to pass over an obstacle on the road. The obstacle may be a speed bump, a gully or drain cover. If an obstacle causes the radar beam to be tilted down towards the street due to the vehicle braking or the presence of a hole in the road, this could result in the vehicle undertaking emergency braking for example, or the vehicle slowing down which may affect the overall driving, or lead to delays on the journey, particularly for autonomous vehicles.

Using acceleration measurements and radar information to correct the beam tilt, or obtain system information will result in overall improved system performance.

Figure 1:
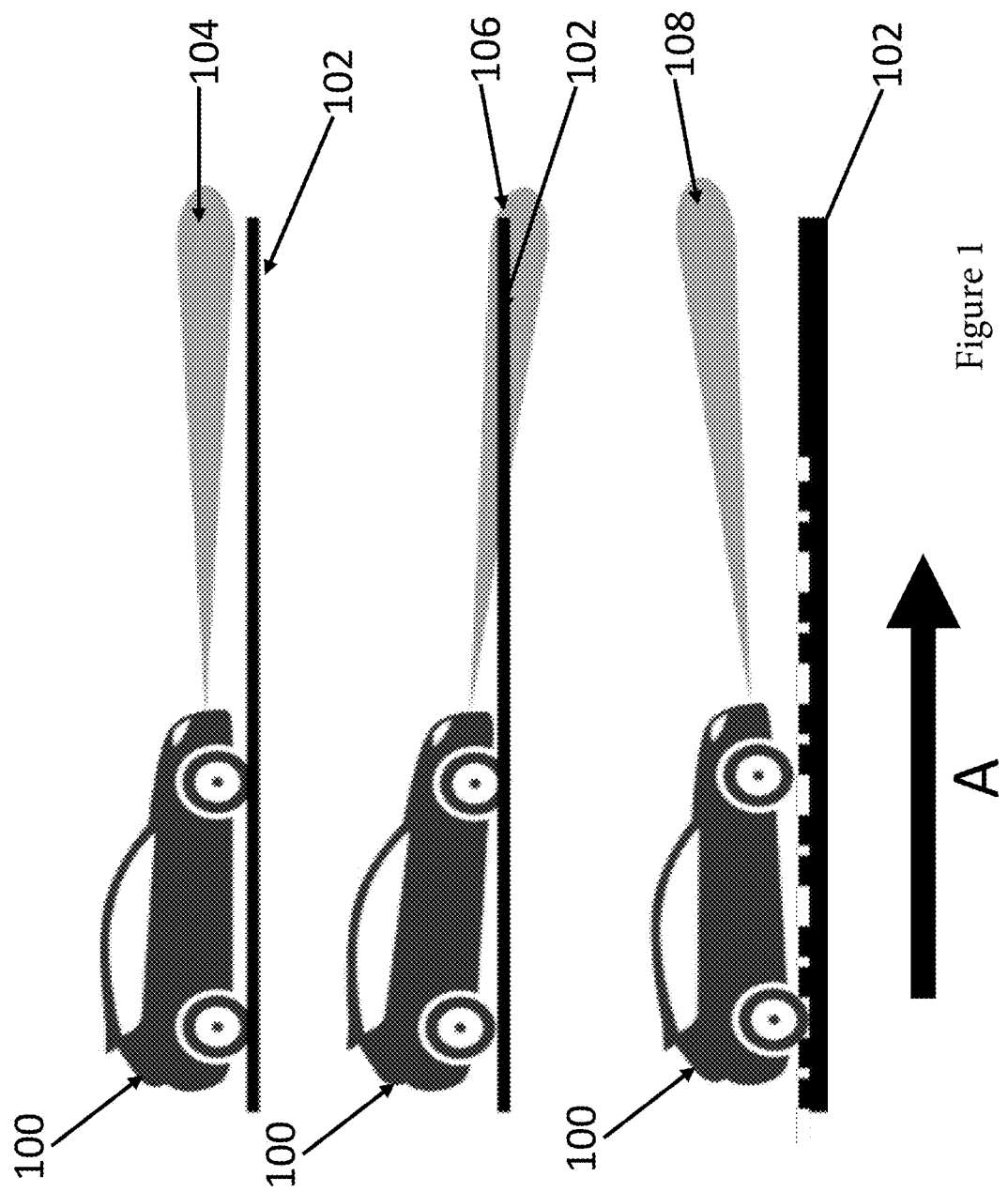
FIG. 1 illustrates examples of radar signals from vehicles driven under different conditions.
Figure 2:
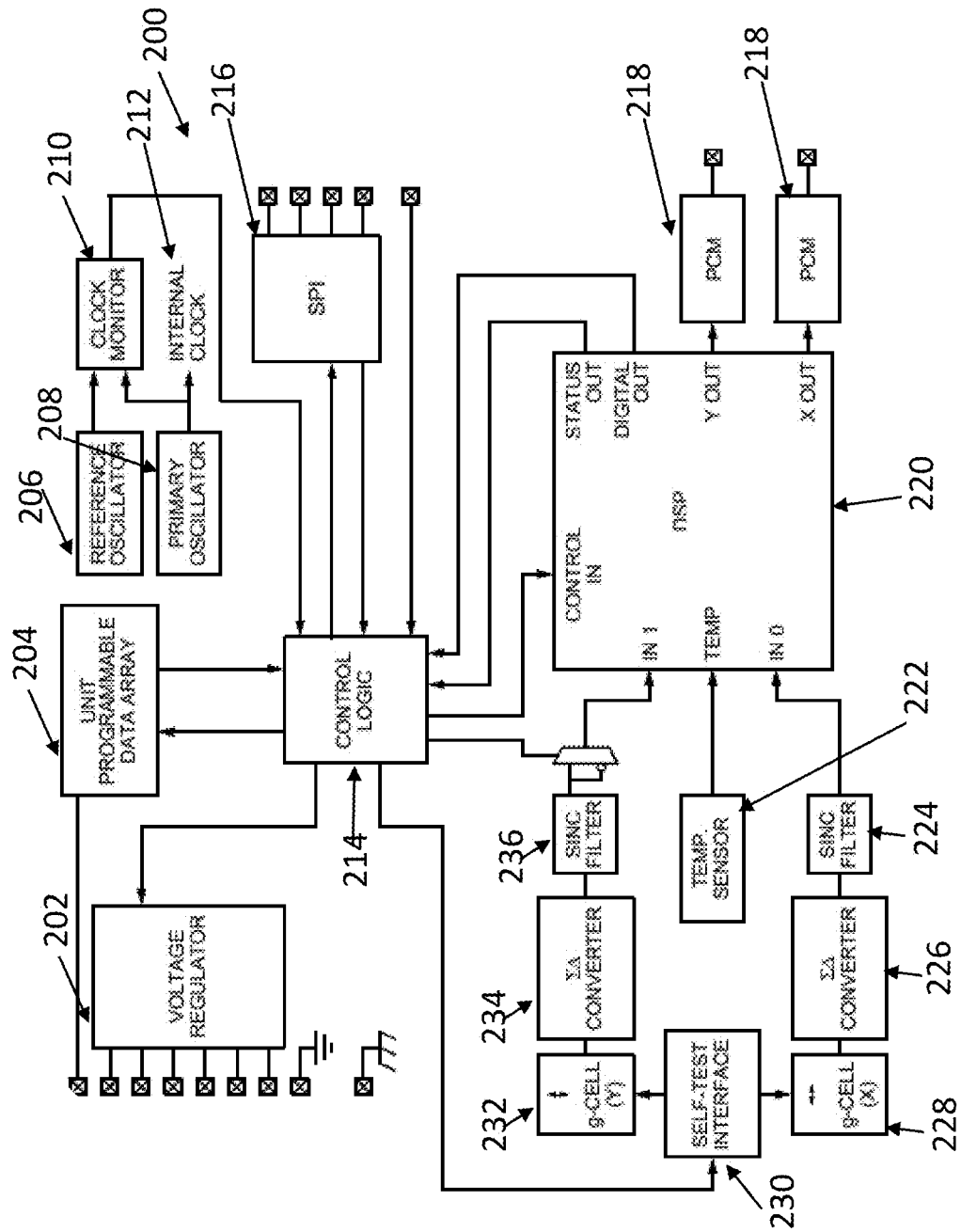
FIG. 2 illustrates an acceleration sensor that is used in the invention

FIG. 2 is an example of an acceleration sensor 200 that may be used in an embodiment of the invention. The acceleration sensor 200 includes voltage regulator 202, programmable data array 204, reference oscillator 206, primary oscillator 208, clock monitor 210, internal clock 212, control logic 214, serial peripheral interface (SPI) 216, pulse code modulator (PCM) 218, digital signal processor (DSP) 220, temperature sensor 222, sin c filters 224 and 236, converters 226 and 234, g-cells 228 and 232, self-test interface 230. In an example of the invention the acceleration sensor 200 measures the acceleration of the radar sensor on the vehicle in the vertical direction, as the vehicle is moving, but in some examples, the sensor may measure the acceleration of the radar sensor in other directions with respect to the direction of movement of the vehicle. Generally, the acceleration will be measured at an angle between 30° to 150° to the direction of travel of the vehicle, or more particularly at an angle between 75° and 105°. In a further preferred example of the invention the acceleration is measured in a direction that is substantially vertical to the direction of travel of the vehicle. The measurement of the acceleration of the radar sensor or the vehicle chassis in the vertical direction for example, can be realized based on the principle of a differential capacitance arising from acceleration-induced motion of the radar sensor.

Figure 3:
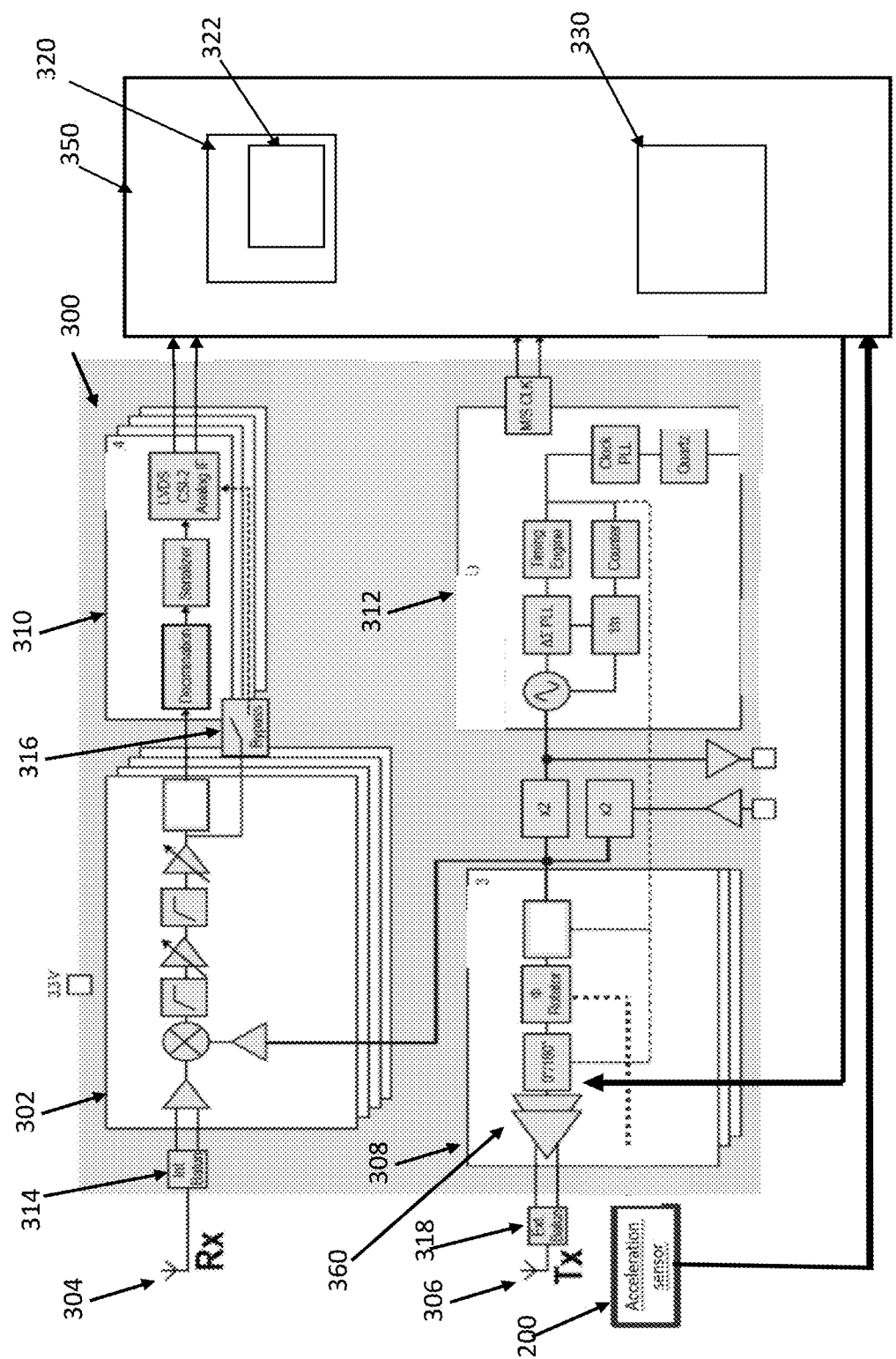
FIG. 3 is an example of the radar device of the invention.

FIG. 3 is an illustration of an example of circuitry to implement an example of the invention that includes a radar 300 sensor, acceleration sensor 200, automotive radar microcontroller 350 that includes processor 320 and memory 330. The processor 320 may also include a calibration unit 2 to calibrate the radar signal. The radar sensor 300 includes a receiver array 302, receiver antenna 304, transmitter array 308, that includes a beam corrector 360 (in an example of the invention the beam corrector may be a beam steerer or a phase rotator), transmitter antenna 306, output array 310, chirp generator 312, internal balun 314, external balun 318, and bypass 316. The acceleration sensor 200 is coupled to the automotive radar microcontroller 350. The radar sensor generates a radio frequency that is transmitted, reflected by objects and afterwards received via the RX antennas. The received signals are mixed to a lower frequency and digitized for further processing in the Microcontroller.

In this example of the invention this circuitry uses a beam-corrector functionality to adjust and/or correct beam tilt error in the transmitted beam of the radar sensor caused by vehicle chassis movements. The calculated beam tilt of the sensor will be compared with a pre-set reference value for the beam tilt, and if the difference between these two measurements exceeds a pre-set threshold, the beam tilt will be adjusted to a pre-set value, to correct the beam tilt back to that required. In an embodiment of the invention the pre-set reference threshold may be set when the radar sensor is initially installed on the vehicle, or it may be changed at various times according to the driving conditions, or other external factors. The measured acceleration value is used to adjust the transmitted radar beam tilt using beam corrector 360 in a phased-array antenna setup. In an example of the invention, it will be a simple relationship between the measured acceleration and the tilt angle, so that if the acceleration exceeds a value x, then the radar beam is corrected to angle y°. In an example of the invention, the greater the acceleration then the more the tilt angle is corrected. In addition, the relationship will also account for latency in the radar beam.

Figure 4:
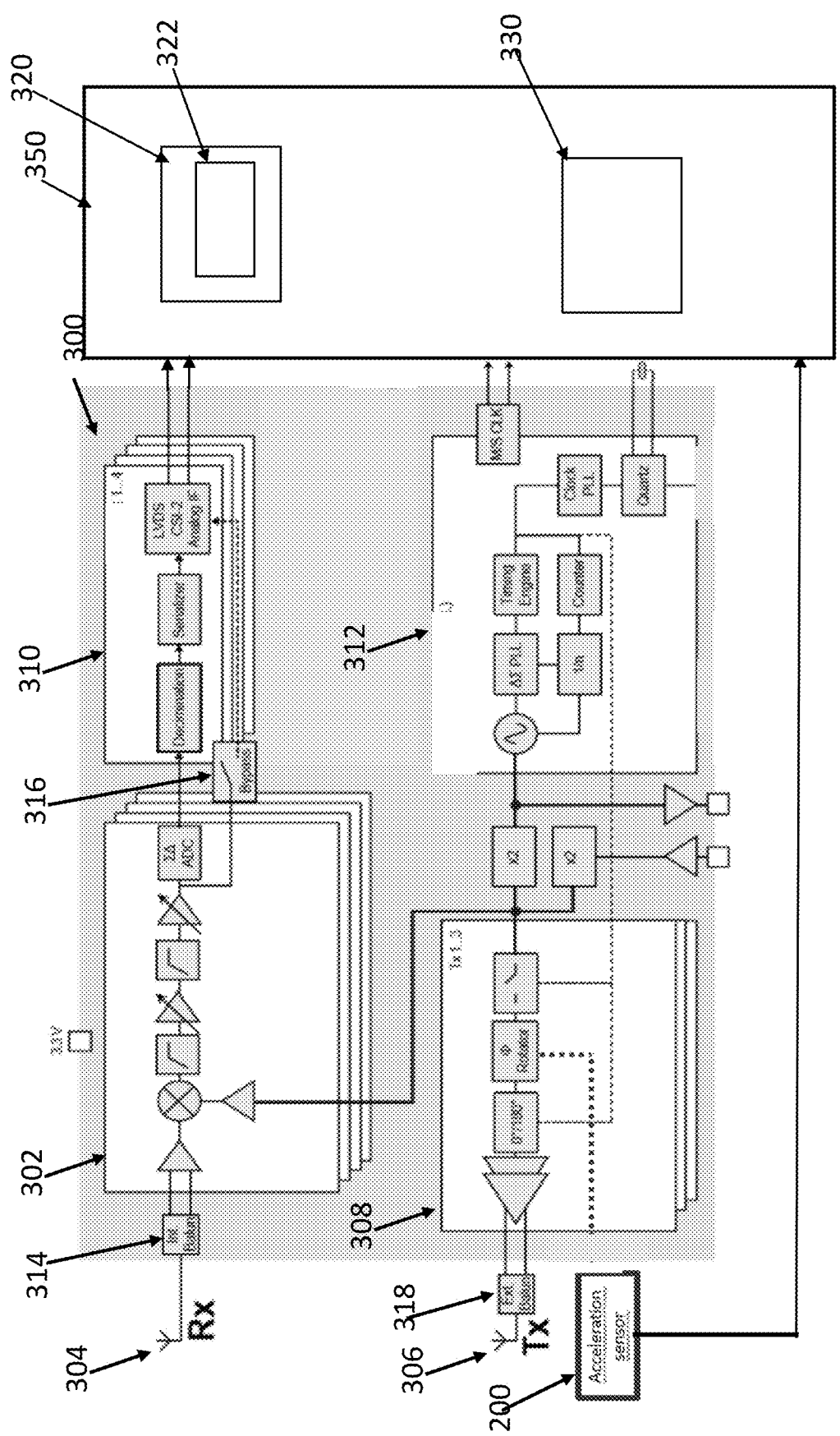
FIG. 4 is an alternative example of the radar device of the invention

FIG. 4 shows the circuitry used in an alternative approach to correct the beam tilt. Like elements from FIG. 3 have been given the same reference numerals. In this example of the invention the circuitry does not include a beam corrector but instead information from the acceleration sensor 200 is processed using software within the automotive radar microcontroller 350 to calculate the beam tilt, and the microcontroller will communicate with radar sensor 300 to correct the tilt of the radar beam, according to the comparison with the threshold value.

In an example of the invention the circuitry of FIGS. 3 and 4 can operate to (i) correct radar beam elevation based on the measured acceleration of the radar sensor whilst the vehicle is in motion and/or (ii) to classify received radar data. Generally, the classified received data will be used for the subsequent correction of the radar beam tilt, but the classified data may also be used for other purposes, such as later software classification of the radar data.

In an example of the invention, the acceleration sensor 200 will measure the vertical movement of the radar sensor 300 as the vehicle chassis is moving, for example due to the vehicle travelling over a bumpy road, the vehicle accelerating or breaking. The acceleration sensor 200 may be directly coupled to the radar sensor 300, or may alternatively be mounted somewhere on the vehicle chassis to measure the acceleration of the chassis. The measured vertical acceleration can be used to correct the tilt of automotive radar beam in elevation due to vehicle chassis movements (e.g. bumpy road, acceleration, breaking) or to classify the received data during chassis movements. All the measured data will be stored in memory 330 and processor 320 will analyse the measured data, and perform the beam correction and or data evaluation.

The memory 330 of automotive radar microcontroller 350 will have details of the vertical tilt threshold that is used to determine if the beam angle of the radar needs to be corrected. The threshold may be calculated based on various parameters of the vehicle including the vehicle acceleration, and in some examples of the invention, the threshold may be dynamically adjusted according to the specific driving conditions at that time. Typically, the threshold is calculated in advance and stored in the microcontroller 350. In operation of the radar sensor, the threshold is compared with the measured tilt angle as described above.

In an example of the invention, the tilt correction may be carried out as part of a calibration correction. In one example, the radar sensor for each vehicle will have been calibrated to a set standard at the production facility. The calibration may be for the vehicle software, in which case all vehicles in a specific production run will have the same calibration standard. In an example of the invention the calibration process may calibrate a correction factor against the measured acceleration value of the sensor. This can be done by measuring the beam tilt of the radar sensor against the measured acceleration. These measurements can then be used to correct the tilt back to the expected calibration measurement.

Figure 5:
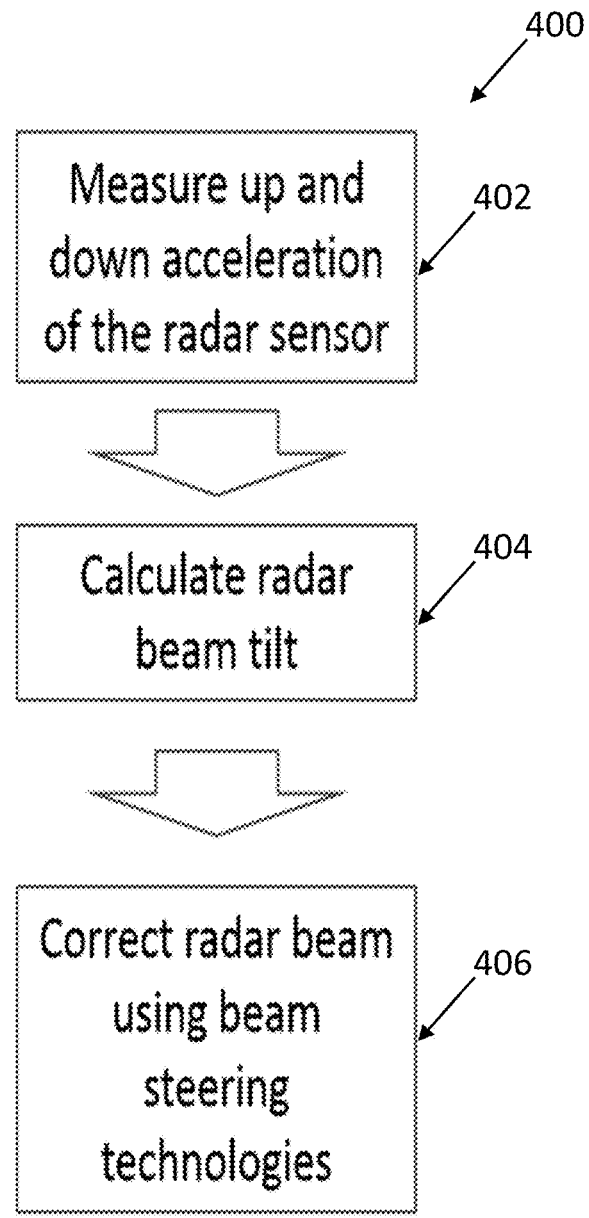
FIG. 5 is a flow chart illustrating the method of the invention.

FIG. 5 is flow chart 400 showing the steps in an example of the method of the invention. At 402 the vertical acceleration of the radar sensor on a vehicle is measured by the acceleration sensor, this output passes to 404 and the tilt of the radar beam extending from the vehicle that is due to the changing motion of the vehicle is calculated, at 406 the radar beam tilt is corrected back to the standard (by comparing the tilt with the vertical threshold limit that is stored in the microcontroller 350), or the tilt information is used to evaluate the radar data, and no adjustment of the radar beam occurs. This correction may be performed using the beam corrector, or the software control as discussed above. In an example of the invention, the tilt correction angle corr(t) is equal to measured vertical acceleration a(t)' multiplied by a correction factor m, added to a latency function f(t) as shown in equation 1 below:

$$corr(t) = a(t)*m + f(t); \qquad \text{equation 1}$$

If 406 results in the correction of the radar beam tilt for example, by beam steering technologies, this correction may occur on either the transmitter or the receiver side of the sensor 300. In an example of the invention, for correction on the transmission side, this will be a physical correction of the beam, using the phase rotator 360 for example as shown in FIG. 3, whereas correction or adjustment of the radar beam on the receiver side will be via software control within the automotive radar microcontroller 350, as shown in FIG. 4.

If 406 is used to evaluate the measured radar acceleration, rather than correcting the tilt, then data may be used in software processing to evaluate/classify/weighting the sensor data. This can be used to improve the reliability of autonomous driving vehicles, as the evaluated data can be fed back into the development of autonomous vehicles.

Although examples of the invention are described with reference to a radar unit suitable for an automotive application, it is envisaged that the concepts herein described may be applicable to other applications, such as; MR3003 Radar Transceiver, TEF810X Radar Transceiver; Microcontroller: S32R27: S32R Radar Microcontroller; MMA69XX Automotive Accelerometers.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A radar sensor for use in a vehicle comprising:
   at least one transmitter and at least once receiver to transmit and receive radar signals of the radar sensor;
   an acceleration sensor to measure the acceleration of said radar sensor or the vehicle;
   a processor coupled to said acceleration sensor to calculate a beam tilt of a radar signal projected from said vehicle using said measured acceleration;
   a memory for storing said calculated beam tilt;
   wherein said processor processes said measured acceleration and either adjusts the beam tilt of said radar signal in response to said measured acceleration or classifies the measured data;
   a beam corrector configured to compare said calculated beam tilt with a pre-set reference tilt and adjust said beam tilt to a pre-set value if the difference between the pre-set value and the reference value exceeds a set threshold, and one of the processor and the beam corrector dynamically adjusts the threshold based on driving conditions.

2. The radar sensor according to claim 1 wherein said acceleration sensor is coupled to said transmitter of said radar sensor.

3. The radar sensor according to claim 1 wherein said acceleration sensor measures the acceleration of said radar sensor in a direction that is at an angle between 30° to 150° to the direction of travel in the vehicle.

4. The radar sensor according to claim 3 wherein the direction of the acceleration sensor is at angle between 75° and 105° to the direction of travel.

5. The radar sensor according to claim 1 wherein said beam corrector is a beam steerer or a phase rotator.

6. The radar sensor according to claim 5 wherein said beam corrector is within said at least one transmitter.

7. The radar sensor according to claim 1 wherein the beam tilt of the radar signal is adjusted via software control.

8. The radar unit according to claim 1 wherein said processor processes the classified data from said radar signal in combination with said calculated beam tilt.

9. A method for adjusting a radar signal transmitted from a radar sensor in a vehicle comprising:
    transmitting a radar signal from said radar sensor using a transmitter;
    measuring the acceleration of said vehicle using an acceleration sensor;
    using said measured acceleration to calculate a beam tilt of said radar signal;
    comparing said calculated tilt with a stored reference tilt;
    adjusting the beam tilt of said radar signal if said comparison of the calculated and reference tilt exceeds a predetermined value;
    comparing said calculated beam tilt with a pre-set reference tilt and adjust said beam tilt to a pre-set value if the difference between the pre-set value and the reference value exceeds a set threshold;
    dynamically adjusting the threshold based on driving conditions using one of a processor and a beam corrector.

10. The method according to claim 9 wherein said radar signal is adjusted using a phase rotator.

11. The method according to claim 9 wherein said radar signal is adjusted using software within an automotive radar microcontroller.

12. The method according to claim 9 wherein said acceleration sensor is coupled to said transmitter of said radar sensor.

13. The method according to claim 9 wherein the acceleration of said radar sensor is measured in a direction that is at an angle between 30° to 150° to the direction of travel in the vehicle.

14. The method according to claim 13 wherein the direction of the acceleration sensor is at angle between 75° and 105° to the direction of travel.

* * * * *